United States Patent [19]

Dewald

[11] Patent Number: 5,481,523
[45] Date of Patent: Jan. 2, 1996

[54] GANTRY FOR POSITIONING A READ/WRITE HEAD OF A HOLOGRAPHIC INFORMATION STORAGE SYSTEM

[75] Inventor: Duane S. Dewald, Austin, Tex.

[73] Assignee: Tamarack Storage Devices, Austin, Tex.

[21] Appl. No.: 173,368

[22] Filed: Dec. 23, 1993

[51] Int. Cl.$^6$ ...................................................... G11B 7/00
[52] U.S. Cl. ................... 369/103; 369/44.11; 369/44.14; 369/112; 359/30
[58] Field of Search ................................. 359/7, 20, 11, 359/26, 21, 22, 29, 30, 15; 365/235, 119, 151; 364/44.41, 100, 44.15, 103, 110, 112, 44.12, 44.11, 44.14; 250/306, 307

[56] References Cited

U.S. PATENT DOCUMENTS

| | | | |
|---|---|---|---|
| 3,407,405 | 10/1968 | Hoadley | 346/108 |
| 3,408,656 | 10/1968 | Lamberts | 346/1 |
| 3,578,836 | 5/1971 | Hannan | 359/470 |
| 3,612,641 | 10/1971 | Eaglesfield | 359/11 |
| 3,635,538 | 1/1972 | Caulfield et al. | 359/7 |
| 3,837,725 | 9/1974 | Bricot et al. | 359/20 |
| 3,874,785 | 4/1975 | Huignard | 359/310 |
| 3,891,976 | 6/1975 | Carlsen | 365/235 |
| 3,989,347 | 11/1976 | Eschler | 369/103 |
| 3,998,521 | 12/1976 | Eschler | 359/21 |
| 4,038,647 | 7/1977 | Schneider | 365/119 |
| 4,063,226 | 12/1977 | Kozma et al. | 365/125 |
| 4,063,795 | 12/1977 | Huignard et al. | 359/7 |
| 4,138,189 | 2/1979 | Huignard et al. | 359/7 |
| 4,175,823 | 11/1979 | Pekau et al. | 359/26 |
| 4,213,193 | 7/1980 | Reid et al. | 365/125 |
| 4,224,480 | 9/1980 | Satoh et al. | 369/50 |

(List continued on next page.)

FOREIGN PATENT DOCUMENTS

0451386A1  10/1991  European Pat. Off. .

OTHER PUBLICATIONS

Steve Redfield, "Holographic Storage: Not a Device but a Storage Class," *SPIE*, vol. 1785, p. 45; 1992.

Ellen Muraskin, "Memory Crystal," *Popular Science*, p. 38, Aug. 1992.

Kirk Ladendorf, "MCC Spinoff Attracts Influx of Capital," *Austin American-Statesman*, Saturday, Feb. 13, 1993.

News Release of Microelectronics and Computer Technology Corporation dated Feb. 12, 1993.

Carolyn Duffy Marsan, "Holographic Memory Could Revolutionize Info Storage," *Federal Computer Week*, Mar. 25, 1991.

Andrew Pollack, "The Hologram Computers of Tomorrow," *The New York Times*, Jun. 9, 1991.

Steve Redfield and lambertus Hesselink, "Enhanced Nondestructive Holographic Readout in Strontium Barium Niobate," *Optical Society of America*; 1988.

*Primary Examiner*—Georgia Y. Epps
*Assistant Examiner*—Kim-Kwok Chu
*Attorney, Agent, or Firm*—Gregory M. Howison

[57] ABSTRACT

A holographic storage system includes a storage media in the form of a disk that is operable to incrementally rotate under a moveable optics system contained in a gantry. The gantry reciprocates along the radial axis of the media in response to a drive mechanism. A laser is operable to direct a beam to a mirror that reflects the light beam along the reciprocating axis of the gantry. The gantry contains a spatial light modulator which is operable to receive the incoming light beam and transform it through a transform lens down to a storage location on the surface of the storage media. A reference beam is reflected from a reflecting surface at a predetermined angle and directed to the storage location by an elliptical mirror to interfere with the data beam and perform a record operation. During data reconstruction, when the reference beam is generated a reconstructed data beam is directed toward the reconstruction optics and a detector array. The detector array is also contained on the gantry.

20 Claims, 4 Drawing Sheets

U.S. PATENT DOCUMENTS

| | | | |
|---|---|---|---|
| 4,256,362 | 3/1981 | Bardos | 359/29 |
| 4,336,976 | 6/1982 | Rodemann et al. | 359/22 |
| 4,458,345 | 7/1984 | Bjorklund et al. | 369/103 |
| 4,550,395 | 10/1985 | Carlson | 369/103 |
| 4,789,977 | 12/1988 | Oudenhuysen et al. | 369/109 |
| 4,927,220 | 5/1990 | Hesselink et al. | 359/7 |
| 4,961,615 | 10/1990 | Owechko et al. | 359/11 |
| 5,187,702 | 2/1993 | Takahashi | 369/44.15 |
| 5,212,572 | 5/1993 | Krantz et al. | 369/44.41 |
| 5,331,621 | 7/1994 | Miyake et al. | 369/112 |
| 5,331,622 | 7/1994 | Ernst | 369/112 |

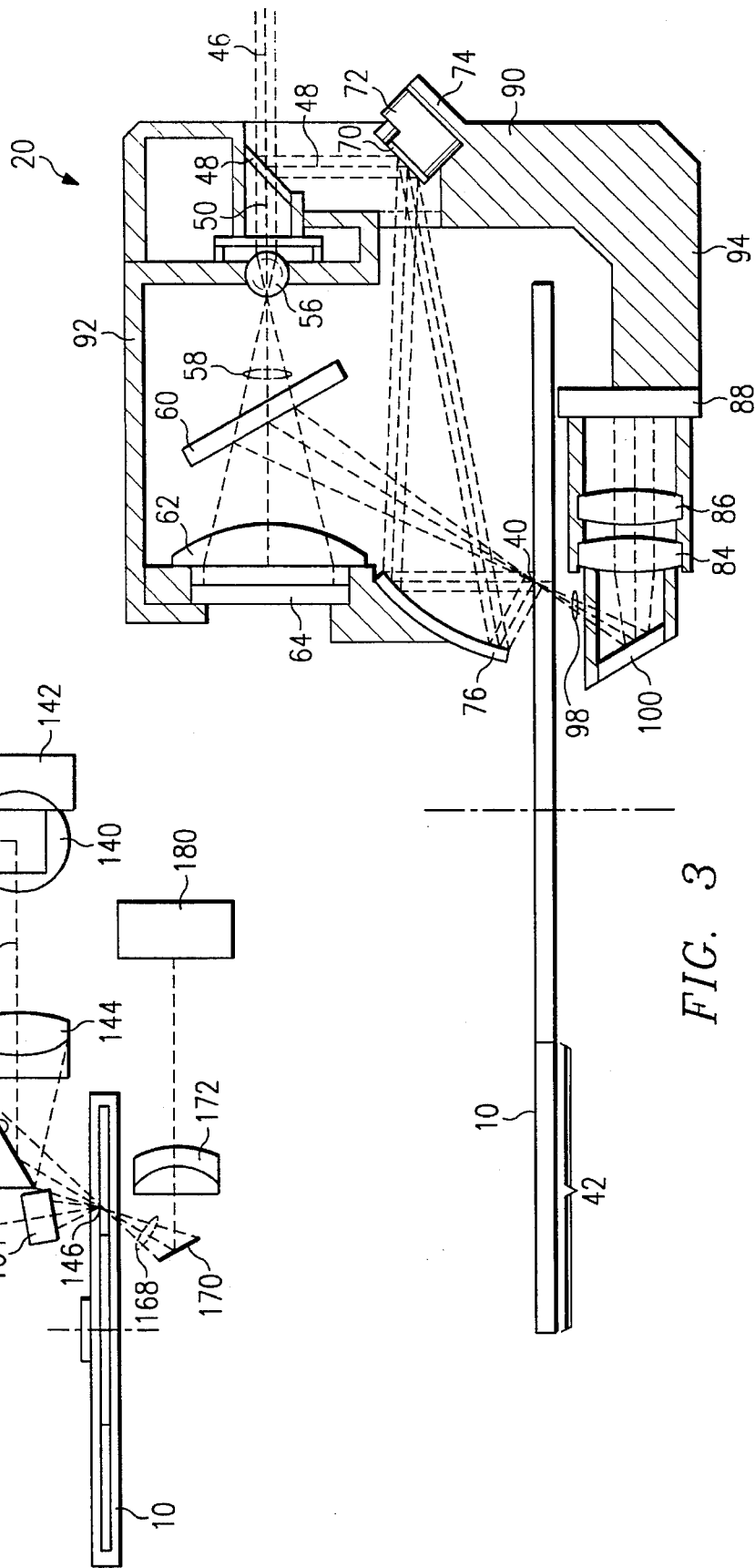

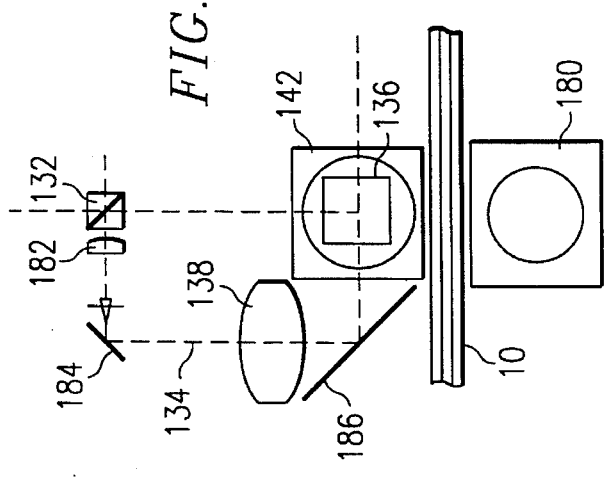
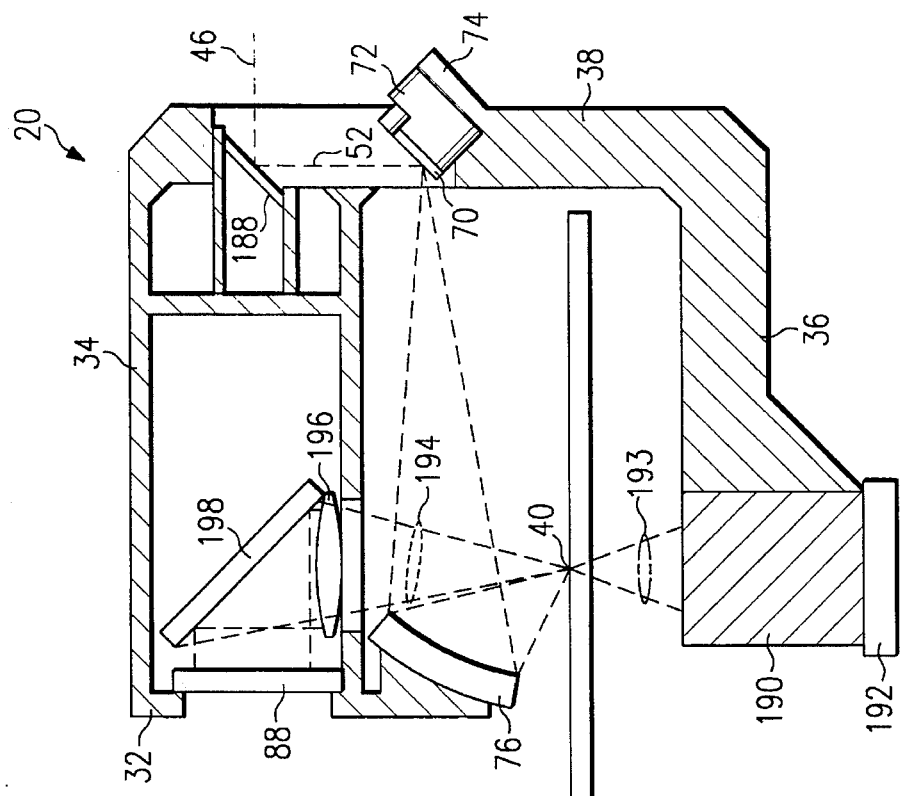

GANTRY FOR POSITIONING A READ/WRITE HEAD OF A HOLOGRAPHIC INFORMATION STORAGE SYSTEM

TECHNICAL FIELD OF THE INVENTION

The present invention pertains in general to holographic data storage devices, and more particularly, to the method and apparatus/or positioning the data and reference beams onto a specific location on a holographic storage media.

CROSS REFERENCE TO RELATED APPLICATIONS

This Application is related to U.S. patent application Ser. No. 08/134,925, filed Oct. 7, 1993, and entitled "Method and Apparatus for Positioning a Light Beam on a Holographic Media" (Atty. Dkt. No. TAMA-22,405) and U.S. patent application Ser. No. 08/133,504, filed Oct. 7, 1993, and entitled "High Capacity Holographic Storage System" (Atty. Dkt. No. TAMA-22,409).

BACKGROUND OF THE INVENTION

As the need for increased data storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage medium, the data then being extracted therefrom. Addressing is achieved by the positioning of the laser beams, and this is typically done through the mechanical movement of mirrors or lenses; however, the storage media itself can be moved relative to fixed laser beams.

There are two types of devices for positioning a data and reference beam onto a specific location within the holographic storage media, one type for positioning the media itself and one type for positioning the data and reference beam, or a combination of both types. When the media is positioned, this has the advantage of utilizing less complex optics. However, it has some disadvantages in the type of mechanism utilized to position the media in that it is mechanical and thus positioning speed is a concern. In positioning systems that rely upon optics to direct both the data beam and the reference beam, there exists some disadvantages due to the complexity of the optics. For example, if the storage media were dimensioned in a 2"×2" format, this might require optical lenses on the order of 2"–2½" diameter. Further some care must taken in the beam deflection systems utilized in association with an optics-only system to ensure that storage locations on the perimeter of the storage media, i.e., the extrema, are not subject to distortions, as these are probably the most difficult regions to access. Of course, a combination of the two systems could be utilized with the disadvantages of both systems being represented in the combination.

SUMMARY OF THE INVENTION

The present invention disclosed and claimed herein comprises a holographic storage system for positioning data and reference beams onto a holographic storage media. The holographic storage system includes a gantry that is moveable relative to the surface of the holographic storage media. Read/Write optics are contained within the gantry and are operable to direct a light beam onto the surface of the holographic storage media as a data beam and reference beam for a record operation and as a reference beam only during a playback operation. The Read/Write optics during a playback operation are operable to detect a reconstructed image. The gantry is positioned by a gantry positioning device such that the Read/Write optics are disposed over the holographic storage media at the select location and along a select path. A laser is provided for generating a light beam, the laser being fixed relative to the gantry. The light beam from the laser is directed by light beam directing optics along the selected path such that the light beam enters the gantry at substantially the same angle and location for all points on the select path.

In another aspect of the present invention, the Read/Write optics are comprised of two sections, a data/reference beam section and a reconstruction section. The data/reference beam section is disposed in an upper portion of the gantry that is disposed over one surface of the holographic storage media with the reconstructive portion of the Read/Write optics disposed in a lower portion of the gantry that is disposed proximate to and over the other side of the holographic storage media. During a record operation, data is superimposed on a data beam and the data beam directed to the select location from one side of the storage media and the reference beam is directed to interfere with the data beam at the select location, this operable to store a Fourier transform of a data image in the holographic storage media at the select location. During a playback operation, only the reference beam is generated and reconstruction optics disposed in the reconstruction portion are operable to receive a reconstructed data image and directed to a detector array.

In yet another aspect of the present invention, the Read/Write optics associated with the data/reference beam section of the gantry include a beam splitter for splitting the laser beam into a reference beam and a data beam. The data beam is expanded and directed to a spatial light modulator to superimpose a data image thereon. The output of the spatial light modulator is then focused onto the select location on the holographic storage media by passing the data beam with the image superimposed thereon through a Fourier transform lens and directing the output thereof to the select storage location. The reference beam, after output by the beam splitter, is directed to intersect at a predetermined angle with the data beam.

BRIEF DESCRIPTION OF THE DRAWINGS

For a more complete understanding of the present invention and the advantages thereof, reference is now made to the following description taken in conjunction with the accompanying Drawings in which:

FIG. 3 illustrates an alternate embodiment of the movable optics system illustrating a cross-section of the gantry and the media;

FIGS. 6 and 6a illustrate an alternate embodiment of the configuration of FIG. 3 utilizing an alternate optics system for the reference beam and data beam directing systems; and FIG. 7 illustrates an alternate embodiment of the system of FIG. 3 for a reflective Read system.

DETAILED DESCRIPTION OF THE INVENTION

Figure 1:
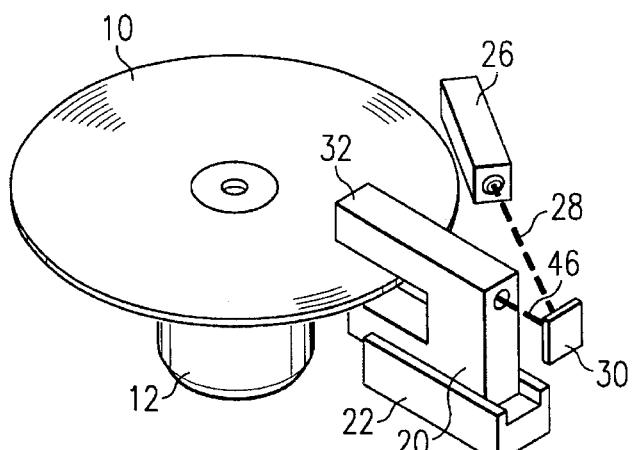
FIG. 1 illustrates a perspective view of one embodiment of the beam positioning system utilizing a moveable optic system in a gantry.

Referring now to FIG. 1, there is illustrated a perspective view of one embodiment of the invention. A holographic storage media in the form of a disk 10 is provided. The disk 10 is operable to be rotated by a disk stepping drive 12 that is operable to selectively position one of a plurality of storage locations 54 within the storage media 10. Digital data is conveyed into an image that is comprised of a plurality of "white areas" and "dark areas" in a predetermined pattern. This image is converted into a Fourier transform and then stored in the storage media region in the form of an interference grating caused by the interference of a reference beam with an object beam having the data image superimposed thereon. As will be described hereinbelow, a plurality of interference gratings illustrating a plurality of "pages" 11 of data are stored in a given storage location 54. Each of the storage locations 54 are arranged in a predetermined pattern on the holographic storage media 10 and are separated by a predetermined distance. A diagrammatic view of the storage region 54 and the multiple pages 11 of information that can be stored therein is illustrated in FIG. 1b.

Figure 1A:
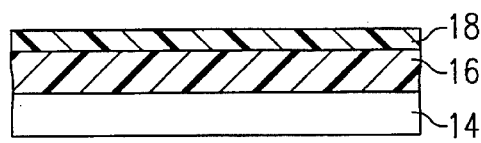
FIGURE 1a illustrates a cross sectional view of the storage media.
Figure 1B:
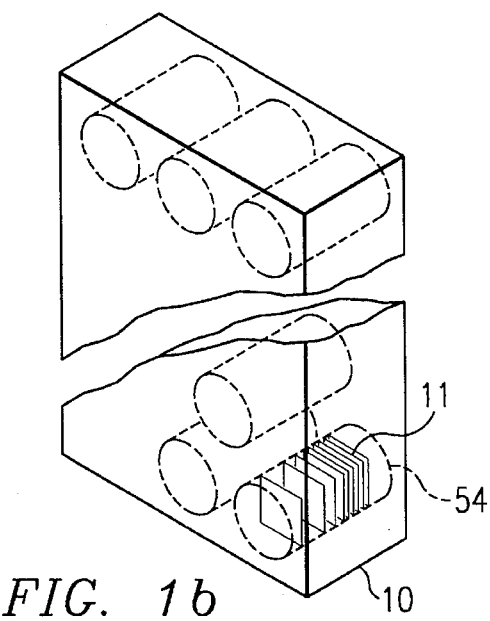
FIGURE 1b illustrates a diagrammatic view of the storage locations.

Referring now to FIG. 1a, there is illustrated a cross-sectional diagram of the storage media 10. A substrate 14 is provided which is comprised of high quality optical surface, such as glass. This is approximately 900 microns in thickness. A layer of photopolymer material 16 is disposed on the surface of the substrate 14 to a thickness of approximately 20 microns. The photopolymer material 16 is a material that undergoes photo-induced polymerization. These compositions have been used to form conventional holograms. These are typically fabricated from a viscous or gelatin-like composition which is photoreactive. When two laser beams intersect in this composition to set up an interference pattern, this causes selective polymerization within the material. These compositions typically contain a polymeric binder, a liquid ethylinically unsaturated monomer and a photoinitiator system. Typically, the layer of viscous or gelatin-like recording material is spun or web coated onto the substrate 14 such as glass to provide a thin coating. A capping layer 18 of material such as Mylar® is then disposed over the gelatin layer. This provides a relatively good optical surface on the upper surface of the gelatin layer, and the glass substrate provides a high quality optical surface on the bottom surface of the gelatin-like recording layer.

When the data beam and reference beam interfere within the storage region 54, the polymerization caused thereby results in the formation of an interference grating. This represents the Fourier transform of the data image that was superimposed on the data beam which, as will be described hereinbelow, can be recovered later as a reconstructed data image by again illuminating the area with a reference beam having substantially the same parameters as the reference beam utilized for the original storage of the interference grating therein.

The optics for both the recording operation and the playback operation are contained within a gantry 20. The gantry 20 is operable to reciprocate along a radial line from the center of the disk 10 outward therefrom under the control of a drive mechanism 22. The drive mechanism 22 is a stepper mechanism that is operable to incrementally move the gantry 20 along the radial line such that the optics can be positioned over a predetermined one of the storage locations 54 on the storage media 10. A laser 26 is provided that is operable to generate a laser beam 28. The laser 26 is a diode laser operating at a wavelength of 680 nanometers with a power of approximately 30 milliwatts. The laser beam 28 is directed toward a reflecting surface 30, which reflecting surface 30 is operable to redirect the beam 28 along the reciprocating path of the gantry 20, such that the angle of the beam 28 and the location thereof upon entry to the gantry 20 are substantially the same for all positions along the path. The most distal end 32 of the gantry 20 is therefore moved from the most centrally disposed storage location 54 to the most peripherally disposed storage location 54 on the surface of the media 10 for any position of the stepping motor 12. As will be described hereinbelow, by utilizing the moveable optics in combination with the rotation of the media 10, a less complex optics system can be utilized in combination with the movement thereof, which movement is more easily achieved than movement of the media alone.

Figure 2:
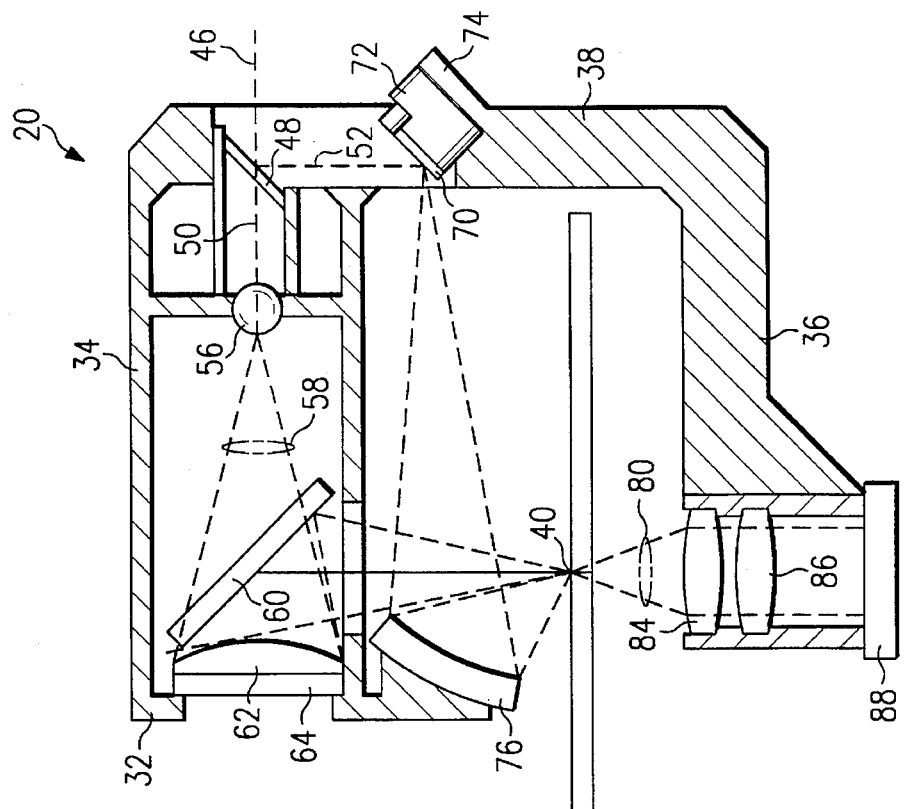
FIG. 2 illustrates a cross-section diagram of one embodiment of the gantry.

Referring now to FIG. 2, there is illustrated a cross-sectional view of the gantry 20. The gantry 20 is comprised of an upper support arm 34 and a lower support arm 36, support arms 34 and 36 connected together by a vertical support arm 38. The upper support arm 34 is operable, in the embodiment of FIG. 2, to support the optics necessary to direct a data beam and a reference beam to a given storage location 40 on the surface of the media 10. It will be seen that only a portion of the media, indicated by a reference numeral 42, is operable to store information thereon. The central portion of the disk 44 is provided for support. The lower support arm 36 is operable to contain the detection optics for receiving a reconstructed data image, as will be described hereinbelow.

The laser beam 28 is reflected from the mirror 30 as a light beam 46, light beam 46 input to a beam splitter 48. The beam splitter 48 is operable to direct a portion of the beam as a data beam 50 and a portion of the beam 46 as a reference beam 52. The data beam 50 is directed toward an expanding optics device 56, which is operable to expand the data beam 50 into an expanded data beam 58, the optics device 56 comprising a positive lens. The expanded data beam 58 is directed through a polarizing beam splitter 60 to a transform lens 62 which is operable to convert the expanded data beam 58 into a collimated beam which is then directed toward a spatial light modulator (SLM) 64. The SLM 64 is comprised of a plurality of polarizing optical elements such as LCDs that are disposed in an array. The LCDs are operable to reflect the light directed thereto with a predetermined polarization. The relative polarization between the different portions of the beams associated with the different elements of the array define binary bits of data and the array defines an overall data image. The data image represents a "page" of information, this page alterable depending on the input provided thereto (not shown). When the data beam is reflected back from the SLM 64, it is again passed through the transform lens 62 and reflected off of the polarizing beam splitter 60 onto the storage location 40, this representing the Fourier transform at the storage location 40.

The vertical support member 38 is operable to support a rotating mirror 70 on a motive device 72, motive device 72 mounted on a support member 74 extending from the vertical support member 38. The mirror 70 is oriented such that it has a rotational axis extending outward from the drawing of FIG. 2. The reference beam 52 is operable to impinge upon the rotational axis of the mirror 70 and be reflected therefrom at one of a plurality of angles, depending upon the angle of rotation of mirror 70, as will be described hereinbelow. This will provide a redirected reference beam at one of a plurality of angles that is directed toward an elliptical mirror 76 and reflected therefrom to the storage location 40.

In order that the reference beam for all angles of reflection from the mirror 70 can be directed toward the storage location 40, the elliptical mirror 76 is disposed such that one of its foci is disposed on the rotational axis of the mirror 70 and one of its foci is disposed on the storage location 40. Therefore, all redirected reference beams emanating from the surface of the mirror 70 at the one foci will be redirected toward the other foci at the storage location 40.

During a record operation, the SLM 64 is operable to create a data image which is then focused by the lens 62 to create the Fourier transform and direct it to the storage location 40 via the polarizing beam splitter 60, which is operable to reflect the beam with the data superimposed thereon to the storage location 40. At the same time, the reference beam 52 is directed at one of the predetermined angles to the storage location 40 to interfere with the data beam. This causes an interference grating to be created and stored within the storage media 10 at the storage location 40. It takes approximately 10–30 milliseconds to form an interference grating within the photopolymer material that comprises the storage media 10. During a playback operation, the SLM 64 is controlled such that no light is reflected therefrom. The reference beam 52 is therefore directed at one of the predetermined locations associated with the desired page. This is a function of addressing logic, which is operable to position the mirror 70. Although not described, the addressing logic also selects which one of the storage locations 40 on the surface of the media 42 is selected for both the record and the playback operations.

When the angle for the reference beam 52 is selected, the storage location 40 is illuminated, resulting in the page of information associated with that angle being reconstructed as a reconstructed data beam 80. The reconstructed data beam 80 is then passed through reconstruction lens 84 and 86, which is operable to collimate the light down onto a detector array 88, which is comprised of an array of detector elements such as CCDs. These CCDs, although not shown, are disposed in the array such that there will be at least one CCD element for each binary data bit in the original data image that was formed by the SLM 64. The detector array 88 is disposed such that the reconstructed data beam 80 will be imaged on the surface thereof.

Referring now to FIG. 3, there is illustrated an alternate embodiment of the gantry 20 of FIG. 2. A vertical support member 90 is operable to hold an upper horizontal support member 92 and a lower horizontal support member 94. As described above with reference to FIG. 2, the upper support member 92 is operable to support the beam splitter 48 that receives the input beam 46 and splits it into the reference beam 48 and the data beam 50, the data beam 50 then being passed to the expanding optics 56 to provide the expanded data beam 58. The beam splitter 60 is disposed such that it is closer to the expanding optics 56 relative to the FIG. 2 embodiment. Further, the collimation/transform lens 62 is disposed slightly forward and offset from the surface of SLM 64 relative to the FIG. 2 embodiment, such that the focal length thereof is pulled somewhat forward. The beam splitter 60, as described above, is a polarizing beam splitter operable to pass the expanded data beam through to the lens 62 for collimation thereof and reflection from the surface of SLM 64. When reflected, the data beam is again focused on the surface of the storage location 40. However, the angle of the beam splitter 60 is altered relative to the FIG. 2 embodiment such that the focused beam from the SLM 64 and lens 62 is directed at an angle to the storage location 40. Therefore, the reconstructed data beam will also exit the other side of the storage media 10 at an angle relative thereto. This is to be compared with the embodiment of FIG. 2, wherein the focused data beam is substantially perpendicular to the surface of the media 10. The reference beam 52 is again reflected from the rotational axis of the reflecting surface 70 to the surface of the elliptical mirror 76 for multiple angles thereof. The reflecting surface 70 is actuated by the motive device 72 which is mounted on the support member 74 associated with the vertical support member 90.

The reconstruction optics of FIG. 3 is disposed at a 90° orientation relative to the reconstruction optics of FIG. 2, comprised of the lens 84 and 86 and the detector 88. In the embodiment of FIG. 3, the detector 88 is disposed at a right angle to the surface of the disk 10. A reconstructed beam 98 will exit the storage location 40 during a playback operation wherein a reference beam is directed thereto at a predetermined angle as defined by the angle of the mirror 70. The reconstructed beam 98 is directed toward a folded mirror 100 that is disposed at an angle relative to the surface of the media 10 such that the reconstructed beam 98 is redirected to the surface of the lens 84 and passes through the lens 84 and the lens 86 to the surface of the detector 88. The configuration of FIG. 3 therefore provides a more compact arrangement as compared to the embodiment of FIG. 2.

Figure 4:
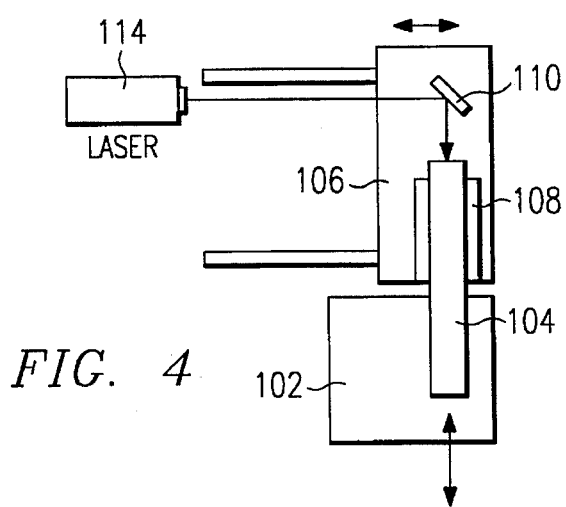
FIG. 4 illustrates an alternate embodiment showing a two-dimensional media wherein the gantry is moved in both an x- and a y-direction.

Referring now to FIG. 4, there is illustrated an alternate embodiment of the present invention that utilizes a two-dimensional media 102. The two-dimensional media 102 is illustrated as being a square, which is approximately 2" ×2" in dimension. A gantry 104 is provided which is similar to a gantry 20 described above with reference to FIGS. 1–3. The gantry 104 is mounted on a movable platform 106 and is driven by a stepping motor drive 108 that is fixedly attached to platform 106. The platform 106 is operable to move in the y-direction, whereas the stepping motor drive 108 is operable to reciprocate the gantry 104 in the x-direction relative to the surface of the media 102. A reflecting surface 110 is disposed on the platform 106 and is operable to receive a light beam from a laser 114 that is directed along the y-axis such that it is reflected from the surface of mirror 110 along the x-axis and directed along the line of reciprocation of the gantry 104. Therefore, as the gantry 104 reciprocates in response to the stepping motor drive 108, the light beam reflected from the surface 110 is maintained along the direction of movement. Further, the platform 106 is operable to be reciprocated by a stepping motor 106 (not shown) along the y-axis, such that the light beam from the laser 114 will always impinge upon the same location on the reflecting surface 110 and will therefore always be directed along the line of reciprocation of the gantry 104.

Figure 5:
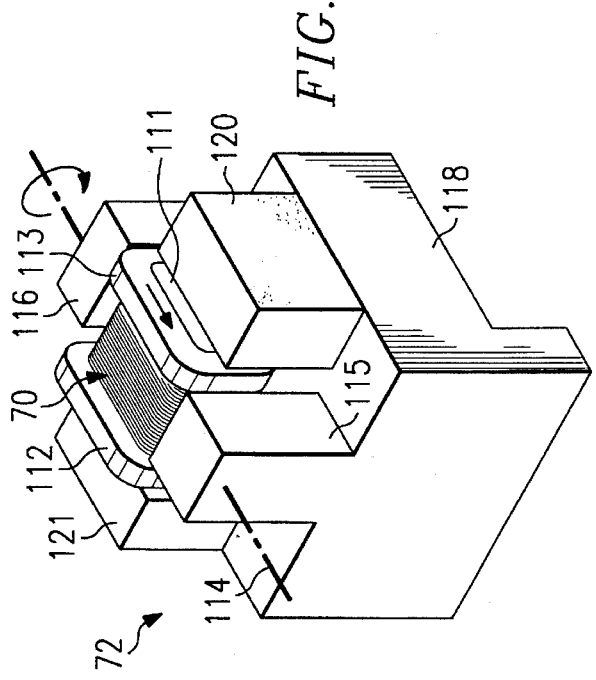
FIG. 5 illustrates a detail of the angle multiplexing lens for selecting pages of information.

Referring now to FIG. 5, them is illustrated a detailed perspective view of the mirror 70 and the carrier 72. The mirror 70 is integrally formed on a block 111 which is cuboidal in shape. The block 111 has one surface thereof mirrored to provide the mirror 70. Two of the sides orthogonal thereto are provided with coils 112 and 113 disposed thereon. When current is run through the coils, they create a magnetic field. The two sides orthogonally disposed with respect to the sides 112 and 111 and the side on which mirror 70 is formed are rotational surfaces that rotate about a rotational axis 114. Two pivot members (not shown) are provided in two mounting arms 115 and 116, disposed on opposite sides of the block 111. Each of the pivoting members (not shown) extend therefrom toward the block 111 with the surfaces of the block 111 adjacent thereto having a detent disposed therein for interfacing with the pivoting members. The block 111 therefore freely pivots about these members.

The mounting arms 115 and 116 are formed on a mounting block 118 which also has two magnets 120 and 121 disposed thereon adjacent the coils 112 and 113, respectively. The coils 112 and 113 have wires (not shown) associated therewith that allow the current flow and the direction thereof to be controlled. As such, a force vector will result in rotation of the block 111 about the rotational axis 114. By changing the magnitude and direction of the current, the block 111 can be rotated in any direction about the rotational axis 114.

Referring now to FIG. 6, there is illustrated an alternate embodiment of the optics system of FIG. 1, illustrating only the suspended optics in a side view. The beam input to the system provides a coherent beam 130 that is directed toward a 50/50 beam splitter 132 to divide the beam 132 into an unencoded data beam 134 and a reference beam 136. The unencoded data beam 134 illustrated from the side view is an expanded beam, as will be described hereinbelow with reference to FIG. 6a. The expanded beam 134 is input to a collimation lens 138 which collimates the light and directs it toward a polarizing beam splitter 140 that is operable to redirect the expanded beam output by the collimation lens 138 to an SLM 142. The SLM 142 will then encode the expanded beam with a data image by changing the polarization of the data spots to reflect the binary state of a logic "1" or a logic "0", each having a different polarization. The light will be reflected from the surface of the SLM 142 and directed back to the beam splitter 140 and, depending upon the polarization, will pass through only one orientation of the polarization such that the black and white data images are created. This results in an encoded data beam 142. Spaced away from the surface of the SLM 142 by a single focal length is a Fourier transform lens 144. The Fourier transform lens 144 is operable to focus the beam down onto the surface of the media 10 at a location 146, the beam being reflected off of the surface of a folding mirror 148 that is disposed between the Fourier transform lens 144 and the media 10 at the location 146. The surface of the media 10 is disposed a focal length away from the Fourier transform lens 144. By orienting the Fourier transform lens 144 in such a manner that it is disposed one focal length away from the SLM 142 and one focal length away from the location 146, a higher degree of invariance is achieved, this being a well-known phenomena.

In order to utilize the configuration of the Fourier transform lens 144 as described above, it is necessary to ensure that the reference beam is also collimated invariant. The reference beam 136 is reflected from the surface of a first prism 150 to then be reflected off the internal surfaces of a second prism 152 and back to the opposite surface of the prism 150 to provide a path length matching operation. The beam exiting the prism 150 is directed toward an angle multiplexing mirror 154 that is controlled by a motor 156. This is similar to the page actuator motor 72 and the mirror 70, described above with reference to FIG. 3. The rotational axis of the mirror 154 is disposed such that the beam exiting the prism 150 will impinge thereon. The rotational axis of mirror 154 is disposed one focal length away from a reference angle objective lens 158 which will redirect the beam toward a folding mirror 162 which redirects the beam toward a reference angle eyepiece 164. The reference angle eyepiece 164 is disposed away from the reference angle objective lens 158 by a distance equal to the sum of the two focal lengths of the lenses 158 and 164. The reference angle eyepiece 164 is disposed one focal length away from the location 146. In this manner, the reference angle objective lens 148 and reference angle eyepiece 164 operate as a telescope to magnify a small angle at the mirror 154 to a large angle at the location 146.

During a Read operation, the unencoded data beam 134 is inhibited and only the reference beam generated. This results in a reconstructed data beam 168 being generated and directed toward a folding mirror 170 and then to a relay lens 172. The relay lens 172 collimates light and directs it toward a CCD detector 180.

Referring now to FIG. 6a, there is illustrated a rear view of the optics associated with the unencoded data beam 134. The beam splitter 132 is operable to direct a portion of the incoming beam 130 toward a beam expander 182 which expands the beam and directs it from a folding mirror 184 to the collimating lens 138. The output of the collimating lens 138 is then reflected from a mirror 186 to the polarizing beam splitter-136 and then to the SLM 142.

Referring now to FIG. 7, there is illustrated an alternate embodiment illustrating the operation wherein the detector and reference beam are disposed on one side of the media 10 and the data beam optics are disposed on the opposite side thereof. The reference beam is generated in the same manner that it was generated in the embodiment of FIG. 3 with the exception that instead of the beam splitter 48, a mirror 188 is utilized to reflect the incoming beam 48 as the reference beam 52. A beam splitter (not shown) is provided for directing a portion of the beam 46 down along the gantry toward a data beam optics system 190. The data beam optics system 190 is operable to direct a beam against an SLM 192 after expansion thereof and then the data image encoded thereon. The encoded data beam is then directed toward an internal Fourier transform lens (not shown) which then focuses the beam onto the storage location 40 from the rear of the media 10. At the same time, the reference beam is directed toward the location 40 by the elliptical mirror 76.

During the Read operation, it is only necessary to direct the reference beam onto the location 40 at the appropriate angle with the reconstructed data beam being directed upward as a reconstructed data beam 194. This is directed toward a collimating lens 196 that collimates the reconstructed data beam and reflects it off of a mirror 198 toward the detector 88.

It can be seen that the structure of FIG. 7 can be configured in a Read Only system wherein the data beam optics 190 is not included. In this manner, the gantry need only scan the upper portion of the disk in order to read the data therefrom. This provides a significantly less complicated system that will accommodate Read Only systems.

In summary., there has been provided a holographic storage system that utilizes a holographic storage media and a moveable optics system. The moveable optics system is operable to move along at least one axis of the storage media such that the optics associated with a record and playback operation can be moved relative to the surface of the storage media. This moveable optics is contained on a gantry which is operable to receive a light beam from an external generation source such as a laser. The light is directed from the laser along the movement path of the gantry such that, when the gantry moves, the light will always be directed along the same path. In the gantry, the light beam is divided into a reference beam and a data beam, with the data beam expanded and directed toward a spatial light modulator to have a data image superimposed thereon. This image is then focused onto a storage location on the surface of the media to provide the Fourier transform of the image at the storage location. The reference beam is then directed toward the surface of the storage media at a select angle to provide for multiple page recording. The interference of the reference beam and the data beam is operable to record an interference grating in the storage location. In a playback operation, the reference beam is directed only toward the surface of the storage media at the storage location to reconstruct the image in a reconstructed data beam. The reconstructed data beam is directed on the opposite side of the storage media to reconstruction optics and a detector array to detect the image.

Although the preferred embodiment has been described in detail, it should be understood that various changes, substitutions and alterations can be made therein without departing from the spirit and scope of the invention as defined by the appended claims.

What is claimed is:

1. A holographic information storage system for positioning data and reference beams onto a holographic storage media, comprising:

a gantry moveable relative to the surface of the holographic storage media;

Read/Write optics disposed within said gantry, said Read/Write optics operable to redirect a light beam onto the surface of the holographic storage media as a data beam and a reference beam during a record operation, and a reference beam only during a playback operation, said Read/Write optics during a playback operation operable to detect a reconstructed image with an associated detector;

a gantry positioning device for positioning said Read/Write optics over the holographic storage media at a select location and along a select path over the surface of the holographic storage media;

a laser for generating said light beam, said light beam being a coherent light beam, said laser fixed relative to said gantry; and light beam directing optics for directing said light beam from said laser along said select path such that said light beam enters said gantry at substantially the same angle and location for all points along said path.

2. The holographic storage media of claim 1, wherein the holographic storage media is a flat media with two parallel surfaces and a defined thickness, and wherein said gantry includes:

an upper support member for supporting a portion of said Read/Write optics and disposed proximate to one of the surfaces of the holographic storage media; and a lower support member operable to hold the remaining portion of the Read/Write optics and disposed such that it is proximate to the other of the two surfaces of the holographic storage media, said gantry operable to move said Read/Write optics along at least one axis of the holographic storage media.

3. The holographic storage media of claim 2, wherein said Read/Write optics comprises a data/reference beam section disposed in said upper support member and a reconstruction section disposed in said lower support member, said data/reference beam section including:

a beam splitter for splitting said light beam into a data beam and a reference beam;

a spatial light modulator for superimposing data on said data beam;

Fourier transform optics for transferring the data beam with data superimposed thereon to said select storage location as a Fourier transform of the data image;

reference beam direction optics for directing said reference beam to intersect with said data beam in said select storage location at a predetermined angle;

said reconstruction section including:

reconstructive optics for receiving a reconstructed data beam during a playback operation, and a detector array for receiving the collimated reconstructed data beam from said reconstruction lens for detection of the data image therein.

4. The holographic storage system of claim 3, and further comprising direction optics operable to expand said data beam after output by said beam splitter to a collimating lens, said collimating lens operable to direct the collimated light to said spatial light modulator for superimposing of data thereon, said directing system operable to direct a data beam after processing by said spatial light modulator to said Fourier transform optics which includes a Fourier transform lens for focusing of said data beam received from said spatial light modulator and said directing system operable to direct said data beam output from said Fourier transform lens to said select storage location.

5. The holographic storage system of claim 4, wherein said Fourier transform lens is disposed away from said spatial light modulator by a distance equal to the focal length of said Fourier transform lens and said Fourier transform lens is disposed away from the surface of the holographic storage media by a distance equal to the focal length of said Fourier transform lens.

6. The holographic storage system of claim 3, wherein the holographic information stored in the holographic storage media is angle multiplexed such that the Fourier transforms of multiple data images can be stored in said storage location, each associated with a reference beam at a predetermined angle and wherein said reference beam direction optics is operable to direct said reference beam at one of a plurality of predetermined angles to intersect with said data beam in said select storage location.

7. The holographic storage system of claim 6, wherein the said angle multiplexing device comprises:

a first reflecting surface for directing said reference beam at one of a plurality of predetermined angles, said first reflecting surface having a rotational axis along the surface thereof about which said first reflecting surface rotates and said reference beam is operable to impinge upon said rotational axis; and a second reflective surface disposed in the path of said reference beam after reflection from said first reflecting surface, said second reflecting surface operable to redirect said reference beam at each of said angles to impinge upon said select storage location.

8. The holographic storage system of claim 7, wherein said second reflecting surface comprises an elliptical mirror with two foci, one of said foci disposed at the rotational axis of said first reflecting surface and the other of said loci disposed at said select storage location such that the other of said foci is disposed on any storage location on the holographic storage media as a function of the position of said gantry.

9. The holographic storage system of claim 1, wherein the holographic storage media comprises a disk shaped member having upper and lower parallel surfaces wherein said gantry positioning device is operable to move said gantry along a radial path and further comprising a disk positioning device for rotating the holographic storage media relative to said gantry.

10. A holographic information storage system for positioning reference beams onto a holographic storage media, comprising:

a gantry moveable relative to the surface of the holographic storage media;

Read optics disposed within said gantry, said Read optics operable to redirect a light beam onto the surface of the holographic storage media as a reference beam during a playback operation to detect a reconstructed image with a detector;

a gantry positioning device for positioning said Read optics over the holographic storage media at a select location and along a select path over the surface of the holographic storage media;

a laser for generating said light beam, said light beam being a coherent light beam, said laser fixed relative to said gantry; and light beam directing optics for directing said light beam from said laser along said select path such that said light beam enters said gantry at substantially the same angle and location for all points along said path.

11. The holographic storage media of claim 10, wherein the holographic storage media is a flat media with two parallel surfaces and a defined thickness, and wherein said gantry includes:

an upper support member for supporting a portion of said Read optics and disposed proximate to one of the surfaces of the holographic storage media; and a lower support member operable to hold the remaining portion of the Read optics and disposed such that it is proximate to the other of the two surfaces of the holographic storage media, said gantry operable to move said Read optics along at least one axis of the holographic storage media.

12. The holographic storage media of claim 11, wherein said Read optics comprises a reference beam section disposed in said upper support member and a reconstruction section disposed in said lower support member, said reference beam section including:

reference beam direction optics for directing said reference beam to intersect with said data beam in said storage location at a predetermined angle;

said reconstruction section including:
reconstructive optics for receiving a reconstructed data beam during a playback operation, and
a detector array for receiving the collimated reconstructed data beam from said reconstruction lens for detection of the data image therein.

13. The holographic storage system of claim 12, wherein the holographic information stored in the holographic storage media is angle multiplexed such that the Fourier transforms of multiple data images can be stored in said storage location, each associated with a reference beam at a predetermined angle and wherein said reference beam direction optics is operable to direct said reference beam at one of a plurality of predetermined angles to intersect with said data beam in said select storage location.

14. The holographic storage system of claim 13, wherein the said angle multiplexing device comprises:

a first reflecting surface for directing said reference beam at one of a plurality of predetermined angles, said first reflecting surface having a rotational axis along the surface thereof about which said first reflecting surface rotates and said reference beam is operable to impinge upon said rotational axis; and a second reflective surface disposed in the path of said reference beam after reflection from said first reflecting surface, said second reflecting surface operable to redirect said reference beam at each of said angles to impinge upon said select storage location.

15. The holographic storage system of claim 14, wherein said second reflecting surface comprises an elliptical mirror with two foci, one of said foci disposed at the rotational axis of said first reflecting surface and the other of said loci disposed at said select storage location such that the other of said foci is disposed on any storage location on the holographic storage media as a function of the position of said gantry.

16. The holographic storage system of claim 10, wherein the holographic storage media comprises a disk shaped member having upper and lower parallel surfaces wherein said gantry positioning device is operable to move said gantry along a radial path and further comprising a disk positioning device for rotating the holographic storage media relative to said gantry.

17. A method for positioning data and reference beams onto a holographic information storage media, comprising the steps of:

disposing Read/Write optics in a gantry that is movable relative to the surface of the holographic storage media, the Read/Write optics operable to redirect a light beam onto the surface of the holographic storage media as a data beam and reference beam during a record operation and a reference beam only during a playback operation, the Read/Write optics during a playback operation operable to detect a reconstructed image with a detector;

positioning the Read/Write optics over the holographic storage media at a select location and at a select path over the surface of the holographic storage media;

generating the light beam, the light beam being a coherent light beam, the step of generating operable to generate the light beam from a fixed position; and directing the light beam from the fixed position along the select path such that the light beam enters the gantry at substantially the same angle and location for all points along the path.

18. The method of claim 17, wherein the holographic storage media is a flat media with two parallel surfaces and a defined thickness, and the step of disposing the Read/Write optics comprises:

disposing a portion of the Read/Write optics on one side of the holographic storage media to control a data beam during a record operation to superimpose data thereon and direct the data beam to the surface and to control and direct a reference beam during both a record and a playback operation; and disposing a second portion of the Read/Write optics on the opposite side of the holographic storage memory for performing a reconstruction operation.

19. The method of claim 17, wherein the step of disposing the first portion of the Read/Write optics on the one side of the holographic storage media is comprised of the steps of:

receiving the light beam from the fixed position;

splitting the light beam into a data beam and a reference beam;

directing the data beam to a spatial light modulator for superimposing data on the data beam;

transferring the data beam with data superimposed thereon to the select storage location as a Fourier transform of the data image;

directing the reference beam to intersect with the data beam in the storage location at a predetermined angle;

the step of disposing the second portion of the Read/Write optics on the opposite side of the holographic storage medium comprising the steps of:

receiving a reconstructed data beam during a playback operation, and detecting the data image therein.

20. The method of claim 19, and further comprising the step of expanding the data beam after the step of splitting by passing it through a collimating lens and then directing the output of a collimating lens to the spatial light modulator for superimposing of data thereon, the sep of directing operable to direct the data beam after processing by the spatial light modulator to the select storage location as the Fourier transform of the data.

* * * * *

UNITED STATES PATENT AND TRADEMARK OFFICE
CERTIFICATE OF CORRECTION

PATENT NO. : 5,481,523

DATED : January 2, 1996

INVENTOR(S) : Dewald

It is certified that error appears in the above-indentified patent and that said Letters Patent is hereby corrected as shown below:

Title page item [54], and col. 1, line 1,

Replace "GANTRY FOR POSITIONING A READ/WRITE HEAD OF A HOLOGRAPHIC INFORMATION STORAGE SYSTEM" WITH --A GANTRY FOR POSITIONING A READ/WRITE HEAD OF A HOLOGRAPHIC INFORMATION STORAGE SYSTEM--.

Column 1, line 9, replace "apparatus/or" with --apparatus for--.

Column 3, line 25, replace "convened" with --converted--.

Column 8, line 35, replace "splitter-136" with --splitter 136--.

Column 9, line 1, replace "summary.," with --summary,--.

UNITED STATES PATENT AND TRADEMARK OFFICE
CERTIFICATE OF CORRECTION

PATENT NO. : 5,481,523

DATED : January 2, 1996

INVENTOR(S) : Dewald

It is certified that error appears in the above-indentified patent and that said Letters Patent is hereby corrected as shown below:

Column 11, Claim 8, line 1, replace "loci" with --foci--.

Column 12, Claim 15, line 22, replace "loci" with --foci--.

Signed and Sealed this

Twenty-third Day of July, 1996

Attest:

BRUCE LEHMAN

*Attesting Officer*　　　*Commissioner of Patents and Trademarks*